(12) United States Patent
Duncan

(10) Patent No.: US 7,075,997 B1
(45) Date of Patent: Jul. 11, 2006

(54) OFDM FRAME SYNCHRONIZATION

(75) Inventor: Steve Duncan, Newton Abbot (GB)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1004 days.

(21) Appl. No.: 09/642,154

(22) Filed: Aug. 21, 2000

(30) Foreign Application Priority Data

Aug. 27, 1999 (GB) .................................. 9920446.3

(51) Int. Cl.
*H04K 1/10* (2006.01)
*H04J 11/00* (2006.01)

(52) U.S. Cl. ...................................... 375/260; 370/208

(58) Field of Classification Search ................ 375/326, 375/354, 260, 222, 368; 370/208, 210, 503
See application file for complete search history.

(56) References Cited

U.S. PATENT DOCUMENTS

| | | | |
|---|---|---|---|
| 5,559,833 A | | 9/1996 | Hayet |
| 5,764,706 A | | 6/1998 | Carlin et al. |
| 5,802,113 A | * | 9/1998 | Kim ........................... 375/326 |
| 5,812,523 A | * | 9/1998 | Isaksson et al. ............ 370/208 |
| 5,949,817 A | * | 9/1999 | Marshall ..................... 375/142 |
| 5,991,289 A | * | 11/1999 | Huang et al. ............... 370/350 |
| 6,501,810 B1 | * | 12/2002 | Karim et al. ............... 375/369 |
| 6,731,702 B1 | * | 5/2004 | Nomura ...................... 375/343 |
| 6,928,048 B1 | * | 8/2005 | Do et al. .................... 370/208 |
| 6,993,083 B1 | * | 1/2006 | Shirakata et al. ........... 375/260 |

FOREIGN PATENT DOCUMENTS

| | | |
|---|---|---|
| EP | 0608024 A1 | 7/1994 |
| EP | 0653858 A2 | 5/1995 |
| EP | 0656706 A2 | 6/1995 |
| EP | 0656706 A3 | 6/1995 |
| EP | 0772332 A2 | 5/1997 |
| EP | 0798903 A2 | 10/1997 |
| EP | 0854620 A2 | 7/1998 |
| EP | 0896457 A1 | 2/1999 |
| EP | 0901260 A2 | 3/1999 |
| EP | 1 296 493 A2 * | 3/2003 |
| GB | 2307155 A | 5/1997 |
| GB | 2318953 A | 5/1998 |
| GB | 2325825 A | 12/1998 |
| WO | WO 99/17493 | 4/1999 |

\* cited by examiner

Primary Examiner—Young T. Tse
(74) Attorney, Agent, or Firm—Birch, Stewart, Kolasch & Birch, LLP

(57) ABSTRACT

FFT demodulation of OFDM symbols is achieved using a frame synchronization pulse generated by deriving absolute values of successive complex samples of the OFDM symbol, determining the difference between such values and other values separated therefrom by a period representing the useful part of the OFDM symbol, integrating the difference values over a plurality of symbols and determining the sample position representing the point at which the integrated difference values substantially change.

10 Claims, 3 Drawing Sheets

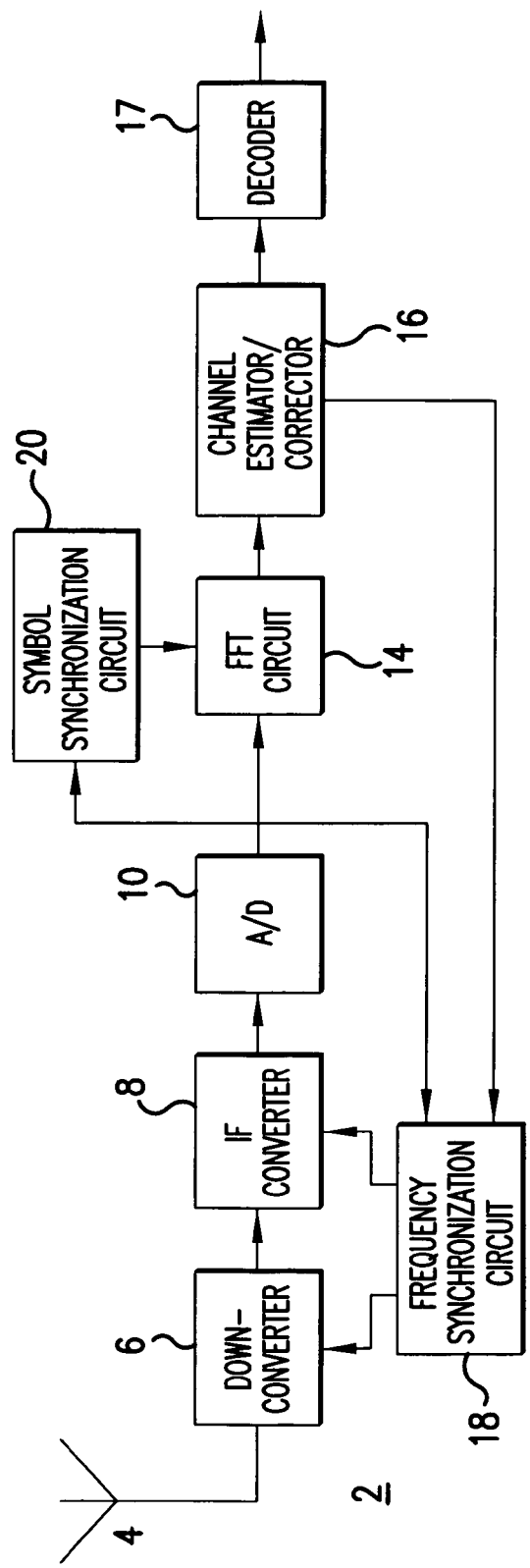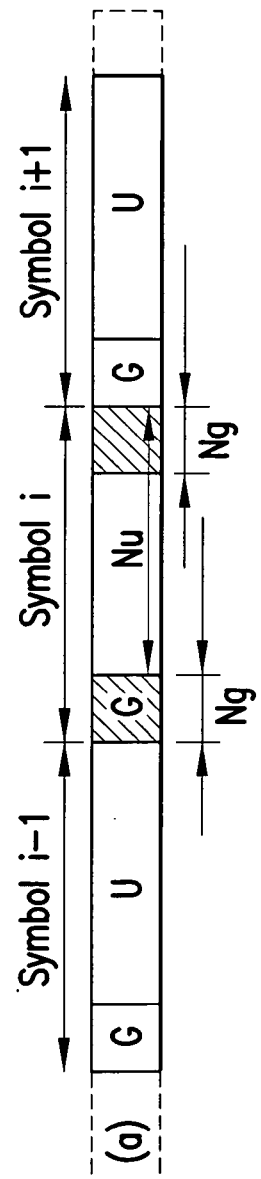
FIG.1
PRIOR ART
FIG.2

OFDM FRAME SYNCHRONIZATION

FIELD OF THE INVENTION

This invention relates to OFDM modulation. It is particularly concerned with the generation of a synchronisation pulse representing an OFDM symbol boundary, for example for use in Fourier Transform demodulation.

BACKGROUND OF THE INVENTION

OFDM systems are well known. Various techniques have been used for synchronisation of OFDM receivers. Some of these techniques require transmission of a special synchronisation signal. Other techniques rely on a standard OFDM signal, in which a complete symbol comprises a "useful part" and a "guard space", the guard space sometimes being referred to as a guard interval, cyclic extension or cyclic prefix.

The guard space precedes the useful part of the symbol and contains a repeat of the data at the end of the useful part. (This is equivalent to having a guard space after the useful part, containing data which is the same as that at the beginning of the useful part.)

Synchronisation techniques which rely upon the duplicated data in the guard space generally operate by performing a cross correlation between complex samples spaced apart by the length of the useful part of the symbol. This generates a timing pulse which is used in Fourier Transformation of the received signal. The timing of the pulse is such that the Fourier Transform window contains only data from a single symbol.

If the timing is incorrect, inter-symbol-interference (ISI) occurs. However, the use of the guard space allows a certain amount of variation in the timing of the pulse while still avoiding ISI. The guard space should be longer than the longest expected spread of delays amongst signals received via different paths. The guard space is relatively small compared with the useful part of the signal; typically, the guard space may contain Nu/32, Nu/16, Nu/8 or Nu/4 samples, where Nu is the number of samples in the useful part of the symbol.

It would be desirable to provide a simpler and less expensive technique for synchronisation, and preferably one which can produce more accurate results.

Aspects of the present invention are set out in the accompanying claims.

According to a further aspect, a synchronisation pulse for a Fourier Transform demodulator is generated by taking absolute values of complex samples of an OFDM symbol, determining the difference between absolute values which are separated by the length of the useful part of the signal, and generating the synchronisation pulse in response to determining the time at which there is a substantial increase in the difference value.

The invention also extends to apparatus for generating such a synchronisation pulse, and to a method and an apparatus for receiving an OFDM signal using such techniques.

Using the method of the invention, the difference between the absolute values of the complex values will be very small when those complex values are equal. Thus, this difference will remain small whenever the samples in a guard space are subtracted from the corresponding values within the useful part of the symbol. When the values cease to be small, this represents the end of the symbol, and this point can be used to allow an FFT demodulator window to be aligned with the OFDM symbol.

It is found that, for example because of slight drift in the local oscillator, the complex samples of an OFDM signal can suffer different phase rotations within the period of a single symbol. Thus, although nominally the data in a guard space should correspond to part of the data in the useful part of the symbol, the actual complex values derived from the signal may differ because of this phase rotation. However, by taking the absolute values of the complex samples, such differences are reduced substantially. Furthermore, because the system handles real, rather than complex, values, data storage requirements are reduced. The complexities and inaccuracies associated with multipliers can also be avoided. The arrangement can also produce better accuracy than these systems which rely on integrating the output of a cross-correlator, and better acquisition times than prior art systems relying on phase locked loops (PLL's).

Preferably, the difference values are integrated over a number of symbols. Preferably this is achieved using an infinite impulse response (IIR) filter.

BRIEF DESCRIPTION OF THE DRAWINGS

An arrangement embodying the arrangement will now be described by way of example with reference to the accompanying drawings, in which:

FIG. 1 is a block diagram of an OFDM receiver;

FIG. 2 represents an OFDM signal;

DETAILED DESCRIPTION

Figure 3:
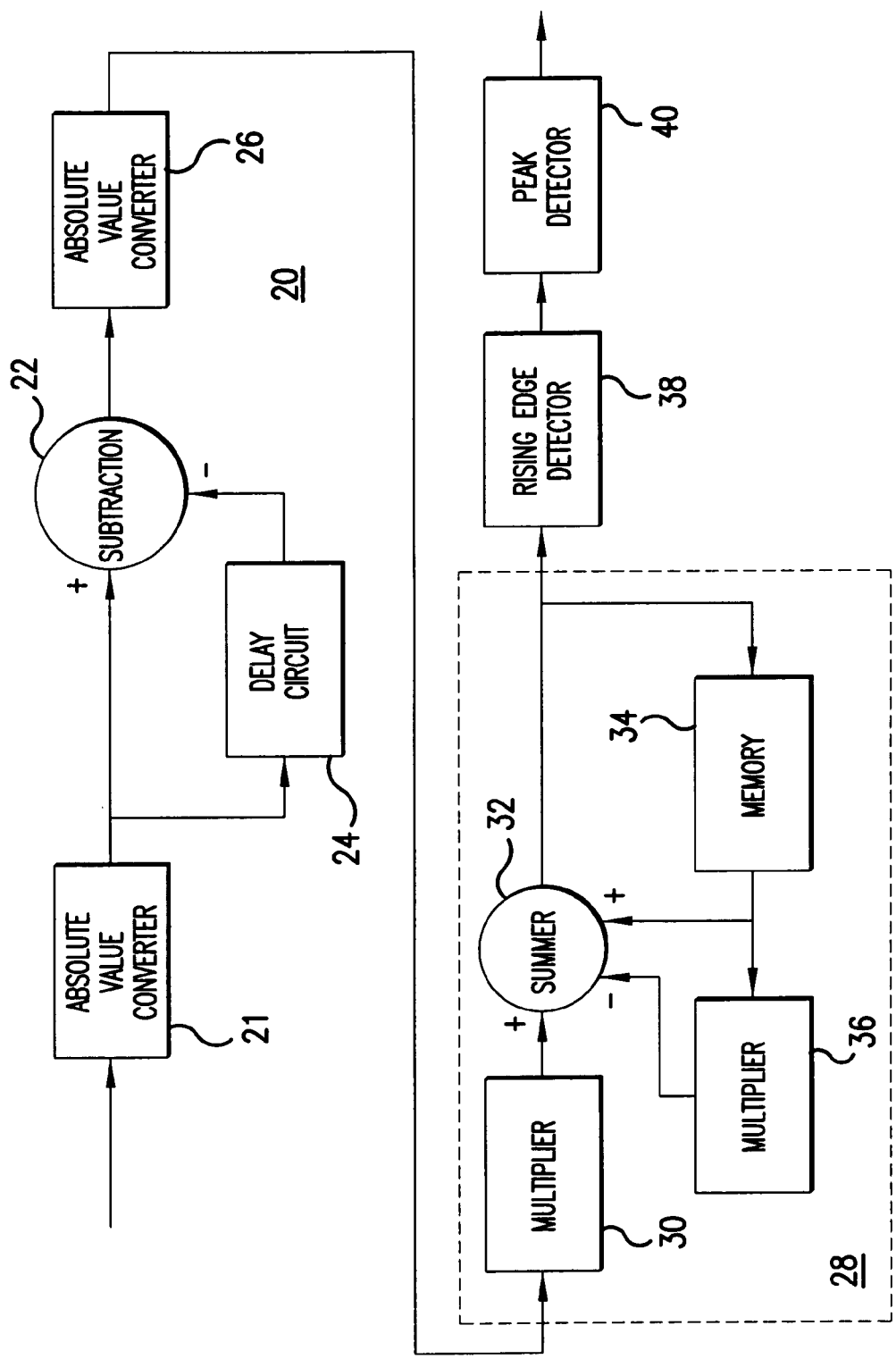
FIG. 3 schematically illustrates the processing carried out in a Fourier Transform synchroniser circuit of a receiver according to the present invention.

Referring to FIG. 1, an OFDM receiver 2 comprises an antenna 4 which receives a signal and presents it to a down-converter 6 which converts the RF signal to an IF signal. This is then converted into a baseband signal by an IF-to-baseband converter 8. This produces at its output complex samples of each transmitted OFDM symbol. These complex samples are digitised by an analog-to-digital (A/D) converter 10, and delivered to a Fast Fourier Transform (FFT) circuit 14. The FFT circuit 14 converts the samples from the time domain to the frequency domain, and the symbol data at the output is provided to a channel estimator and corrector 16 and a decoder 17. If desired, the complex samples from the A/D converter 10 and/or a signal from the channel estimator and corrector 16 may also be delivered to a frequency synchronisation circuit 18, which is used to control the local oscillator frequencies used by the down converter 6 and the IF-to-baseband converter 8; however, it is also possible to implement the recever without requiring such feedback.

The complex samples are also delivered to a symbol synchronisation circuit 20, which generates a synchronisation pulse for use by the Fast Fourier Transform (FFT) circuit 14. The FFT circuit 14 requires the synchronisation pulse so that each transformation operation is aligned with the start of the OFDM symbol.

The circuit described so far is known from the prior art. The present invention is directed to a novel and inventive technique for use in the symbol synchronisation circuit 20.

Referring to FIG. 2, it is assumed that an OFDM symbol consists of Nu+Ng samples, representing Nu samples in the useful part U of the signal, preceded by Ng samples in the guard space G. The Ng samples in the guard space G contain the same data as the last Ng samples of the useful part U of the symbol (as indicated, in respect of one of the symbols, by hatching).

FIG. 3 is a schematic block diagram representing the functions performed by the circuit 20.

The complex samples from the IF-to-baseband converter 8 are converted into absolute values by an absolute value converter 21. These output values are delivered to a subtractor 22 and to delay circuit 24, which delays the values by an amount corresponding to the length of the useful part U of the OFDM symbol. Accordingly, the delay circuit 24 delays the absolute values by a period corresponding to Nu samples. The subtractor 22 subtracts the delayed absolute values from the non-delayed values received from the absolute value converter 21. The resultant difference value is converted into an absolute value by a second absolute value converter 26. The output of the absolute value converter 26 will therefore be substantially zero during the period that the last Ng samples contained in the useful part U are present at the input of the absolute value converter 21, because at this time the subtractor will be receiving those samples at its positive input and, at its negative input, samples of equal value derived from the guard space G. At other times, the output of the absolute value converter 26 would adopt values determined by the correlation, if any, between data in successive symbols, but in practice this would be essentially random.

The output of the absolute value converter 26 will therefore comprise successive absolute difference values, each associated with a respective sample of the OFDM symbol. These difference values are then passed to an integrating circuit 28, which serves to integrate each absolute difference value over a number of symbols.

This is achieved by multiplying each difference value by a factor G1 in a multiplier 30, the output of which is delivered to a positive input of a summing circuit 32. The output of the summing circuit is sent to a delay circuit 34 formed by a first-in, first-out (FIFO) memory 34 which serves to delay each of its input signals by a period corresponding to an entire OFDM symbol, i.e. Nu+Ng samples. The output of the delay circuit 34 is delivered to a positive input of the summer 32, and also to a further multiplying circuit 36 which multiplies the output by G2. The resultant of this is sent to a negative input of the summer 32.

As a consequence of this arrangement, the output of the summer comprises successive samples S(n,m), where n represents the number of the sample within the OFDM symbol and m represents the symbol, and wherein:

$$S(n,m) = G1(V(n,m)) + (1-G2)S(n,m-1)$$

and wherein V(n,m) represents the absolute value for the sample position n of symbol m.

Figure 4:
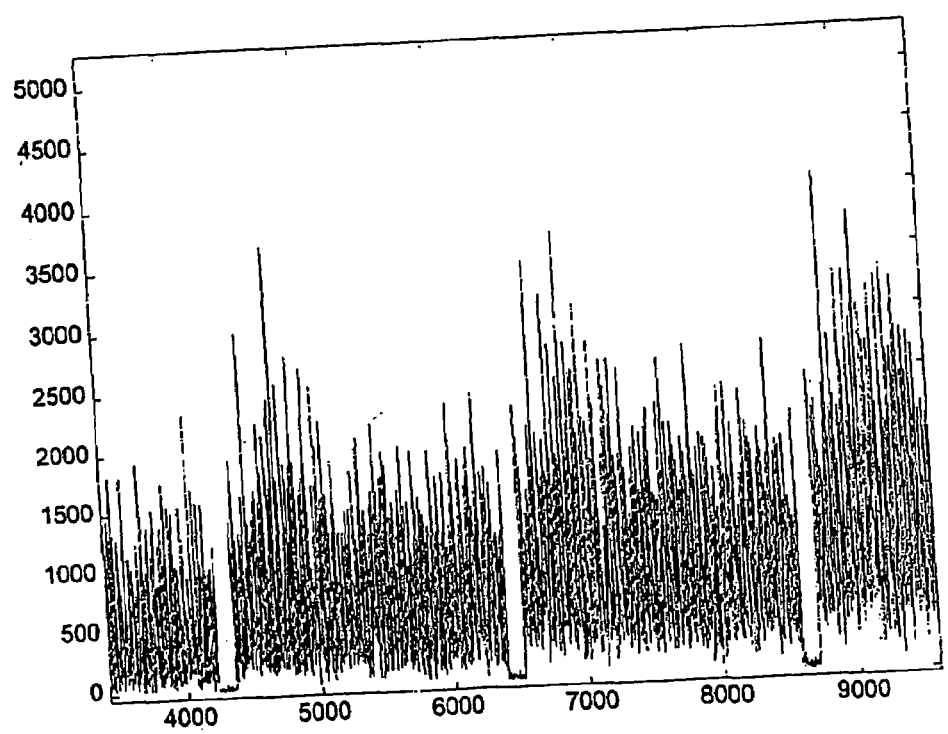
FIG. 4 shows a typical trace of an absolute difference signal arising in the synchronising circuit of FIG. 3.

A typical output of the integrating circuit 28 is shown in FIG. 4. It will be noted that there are spaced periods in which the output is substantially zero, corresponding to the periods in which the last Ng symbols of the useful part U are present at the input of the absolute value converter 21. These periods are separated by intervals in which there is a substantial amount of random data. The distinction between the two types of intervals is enhanced by integration over a number of symbol periods.

Figure 5:
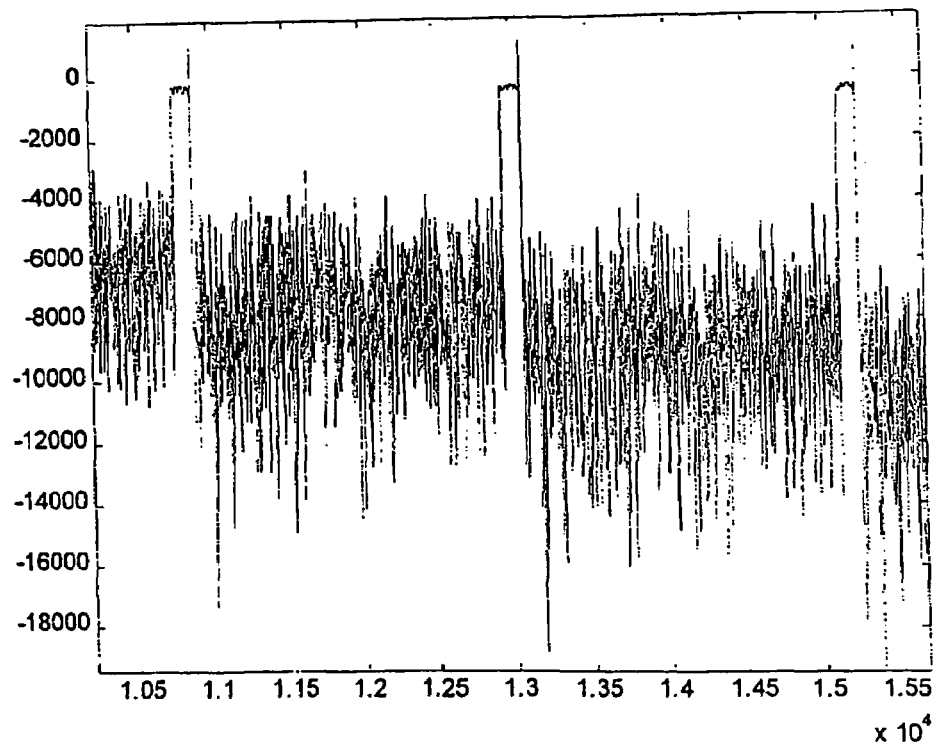
FIG. 5 is a typical output from a rising edge detector of the synchronising circuit.

The output of the summing circuit 32 is delivered to a rising edge detector 38, a typical output of which is shown in FIG. 5. This output is delivered to a peak detector 40, which detects the trailing edge of each of the periods corresponding to the presence of the guard interval at the output of the delay circuit 34. The peak detector 40 outputs a logic high signal precisely once per OFDM frame, which is used as the sync pulse denoting the end of the OFDM symbol FFT window.

In the preferred embodiment, the delay circuit 34 comprises a plurality of memory elements or registers arranged in a FIFO array. Instead of taking the output of summer 32 for processing in real time, the contents of the registers in the delay circuit 34 can be processed to determine the register (and hence the sample) corresponding to the end of the OFDM symbol.

Whichever arrangement is used, the edge detection and peak detection can be achieved using either hardware or software. The rising edge detector 38 may be implemented by a FIR filter, which may have variable coefficients which are altered following switch on or re-tuning to speed up the locking on to the signal. For example, the FIR filter may be arranged to subtract from the value of the latest sample the values of the preceding n samples. This will give a significant positive value only at the end of the symbol, when the difference between the absolute values ceases to be zero. The value n may be altered not only when acquiring a signal, but also in dependence on, for example, the risk of multi-path interference; when there is significant multi-path interference, there will be noise in the initial part of the period where the difference between the absolute values ought ideally to be zero, so a smaller value for n would be appropriate.

The invention has been described in the context of an OFDM receiver, in which the synchronisation pulse is used to define the window of samples on which a Fast Fourier Transformation is performed. However, the invention is also useful in other circumstances in which there is a need for a synchronisation pulse representing the symbol boundaries; for example, such a pulse would be valuable in a repeater where full FFT demodulation is not performed.

The functional elements described herein can be implemented either in dedicated hardware or in software.

The invention claimed is:

1. A method of generating a synchronization pulse representing a symbol boundary in an OFDM signal comprising useful symbol periods separated by guard spaces, with data in each guard space corresponding to part of the data in a respective useful symbol period, the method comprising:
   deriving the difference between absolute values of samples of the OFDM signal separated by a period corresponding to the useful symbol period,
   providing the difference between the absolute values to an edge detector, and
   generating the synchronization pulse in response to a substantial change in the difference between the absolute values.

2. A method as claimed in claim 1, wherein the difference between the absolute values represents integrated values obtained over a plurality of symbol periods.

3. A method as claimed in claim 2, wherein an infinite impulse response filter is used for producing the integrated values.

4. A method of claim 2, wherein the edge detector comprises a filter.

5. A method of claim 4, wherein the filter has variable coefficients.

6. A method as claimed in claim 1, wherein the edge detector comprises a filter.

7. A method as claimed in claim 6, wherein the filter has variable coefficients.

8. A method as claimed in claim 6, wherein the filter is a finite impulse response filter.

9. A method of claim 1, further comprising:
   demodulating the OFDM signal to produce complex samples of transmitted OFDM samples;
   applying a Fourier Transform to the complex samples; and
   synchronizing a Fourier Transform window with OFDM symbols using the synchronization pulse.

10. An apparatus for generating a synchronization pulse for an OFDM signal, comprising:
    a device for receiving the OFDM signal including useful symbol periods separated by guard spaces, with data in each guard space corresponding to part of the data in a respective useful symbol period;
    a first circuit formed by an edge detector for determining and monitoring the difference between absolute values of samples of the OFDM signal separated by a period corresponding to the useful symbol period; and
    a second circuit for generating the synchronization pulse in response to said first circuit detecting a substantial change in the difference between the absolute values.

* * * * *